US 7,730,991 B2

(12) United States Patent
Grundey (10) Patent No.: US 7,730,991 B2
(45) Date of Patent: Jun. 8, 2010

(54) LOCKING ASSEMBLY AND VEHICLE HAVING SAME

(75) Inventor: Jason William Grundey, Delaware, OH (US)

(73) Assignee: Honda Motor Company, Ltd., Tokyo (JP)

( * ) Notice: Subject to any disclaimer, the term of this patent is extended or adjusted under 35 U.S.C. 154(b) by 356 days.

(21) Appl. No.: 11/836,231

(22) Filed: Aug. 9, 2007

(65) Prior Publication Data

US 2009/0038874 A1   Feb. 12, 2009

(51) Int. Cl.
*B60R 25/00* (2006.01)
(52) U.S. Cl. ...................................................... 180/287
(58) Field of Classification Search ................. 180/287; 340/426.1, 427, 426.3, 542
See application file for complete search history.

(56) References Cited

U.S. PATENT DOCUMENTS

| | | | |
|---|---|---|---|
| 1,875,225 A | | 8/1932 | Despard |
| 2,668,893 A | | 2/1954 | Vaughan |
| 3,646,786 A | * | 3/1972 | Baker ............................. 70/59 |
| 4,013,858 A | | 3/1977 | Grebner et al. |
| 4,037,683 A | * | 7/1977 | LeBell ......................... 180/272 |
| 4,146,761 A | | 3/1979 | Sung |
| 4,168,416 A | | 9/1979 | Josemans |
| 4,291,207 A | | 9/1981 | Reinke et al. |
| 4,553,006 A | | 11/1985 | Little |
| 4,705,920 A | | 11/1987 | Sahrbacker |
| 4,767,895 A | | 8/1988 | Parrish |
| 5,034,576 A | | 7/1991 | Dalebout et al. |
| 5,239,143 A | | 8/1993 | Valenzona |
| 5,444,199 A | | 8/1995 | Burchard et al. |
| 5,593,330 A | * | 1/1997 | Kobayashi ................... 440/84 |
| 5,841,363 A | * | 11/1998 | Jakob et al. ................. 340/5.26 |
| 6,352,045 B1 | * | 3/2002 | Takashima .................. 114/55.5 |
| 6,963,794 B2 | * | 11/2005 | Geber et al. ..................... 701/2 |
| 7,014,517 B2 | | 3/2006 | Suzuki |
| 7,026,912 B2 | | 4/2006 | Suzuki |
| 2004/0090306 A1 | * | 5/2004 | Konno et al. ................ 340/5.62 |
| 2004/0145449 A1 | * | 7/2004 | Yamamoto et al. .......... 340/5.72 |
| 2009/0183587 A1 | * | 7/2009 | Amce ........................... 74/489 |

FOREIGN PATENT DOCUMENTS

FR    2598995  A1  *  11/1987

OTHER PUBLICATIONS

Honda Owner's Manual, TRX250, 1985, total of 74 pages. See pages marked 7 and 10.
"American National Standard for Four Wheel All-Terrain Vehicles—Equipment, Configuration, and Performance Requirements," American National Standards Institute, Inc., Feb. 15, 2001, total of 23 pages. See pages marked 5, 9, 17 and 19.
French-to-English translation of French Patent Application having National Filing No. 86 07481 (Garnier, et al.), total of 10 pages.

* cited by examiner

*Primary Examiner*—Faye M. Fleming
(74) *Attorney, Agent, or Firm*—Ulmer & Berne LLP (57) ABSTRACT

A locking assembly is provided for installation on a saddle-type vehicle such as an ATV. The locking assembly has a locked configuration and an unlocked configuration and comprises a removable portion and a receptacle. The receptacle is configured to engage the removable portion. The locking assembly is configured to unlock and allow powering of the vehicle when the removable portion is engaged in the receptacle and to lock and prevent powering the vehicle when the removable portion is not engaged in the receptacle. The removable portion includes an actuator configured to select from a first operable engine condition and a second inoperable engine condition.

22 Claims, 6 Drawing Sheets

LOCKING ASSEMBLY AND VEHICLE HAVING SAME

TECHNICAL FIELD

The present invention relates to a locking assembly for a saddle-type vehicle such as an all terrain vehicle (hereinafter sometimes referred to as an "ATV"). The locking assembly integrates an engine stop actuator and a security system device.

BACKGROUND OF THE INVENTION

ATVs typically include an engine stop switch which is attached to a left handlebar. The engine stop switch is typically configured such that an operator may use his or her left thumb to actuate the switch without removing his or her left hand from the handlebar. ATVs also typically include a security device, such as a keyed ignition switch, to prevent unauthorized use of the ATV. These two devices are typically provided in separate locations upon a conventional ATV, and can accordingly require excessive assembly time, complexity, space, weight, and/or cost.

SUMMARY

In one embodiment of the present invention, an all terrain vehicle comprises a frame, an engine supported with respect to the frame, a handlebar, and a locking assembly supported with respect to the handlebar. The locking assembly has a locked condition and an unlocked condition. The locking assembly comprises a removable portion and a receptacle configured to engage the removable portion. Also, the locking assembly is configured to unlock and allow powering of the all terrain vehicle when the removable portion is engaged in the receptacle, and to lock and prevent powering of the all terrain vehicle when the removable portion is not engaged in the receptacle. The removable portion includes an actuator configured to select from a first operable engine condition and a second inoperable engine condition when the removable portion is engaged in the receptacle.

In additional embodiments of the present invention, a saddle-type vehicle comprises a frame, an engine supported with respect to the frame, a steering assembly, and a locking assembly supported with respect to the steering assembly. The locking assembly has a locked condition and an unlocked condition. The locking assembly comprises a removable portion and a receptacle configured to engage the removable portion. The locking assembly is configured to unlock and allow powering of the saddle-type vehicle when the removable portion is engaged in the receptacle, and to lock and prevent powering of the saddle-type vehicle when the removable portion is not engaged in the receptacle. The removable portion includes an actuator configured to select from a first operable engine condition and a second inoperable engine condition when the removable portion is engaged in the receptacle.

In still further embodiments of the present invention, a locking assembly for an engine-powered vehicle has a locked configuration and an unlocked configuration and comprises a removable portion and a receptacle configured to engage the removable portion. The locking assembly is configured to unlock and allow powering of the vehicle when the removable portion is engaged in the receptacle and to lock and prevent powering of the vehicle when the removable portion is not engaged in the receptacle. The removable portion includes an actuator configured to select from a first operable engine condition and a second inoperable engine condition.

BRIEF DESCRIPTION OF THE DRAWINGS

While the specification concludes with claims particularly pointing out and distinctly claiming the present invention, it is believed that the same will be better understood from the following description taken in conjunction with tie accompanying drawings in which:

DETAILED DESCRIPTION

The present invention and its operation are hereinafter described in detail in connection with the views and examples of FIGS. 1-13, wherein like numbers indicate the same or corresponding elements throughout the views. These embodiments are shown and described only for purposes of illustrating examples of the elements of the invention, and should not be considered as limiting on alternative structures or assemblies that will be apparent to those of ordinary skill in the art.

Figure 1:
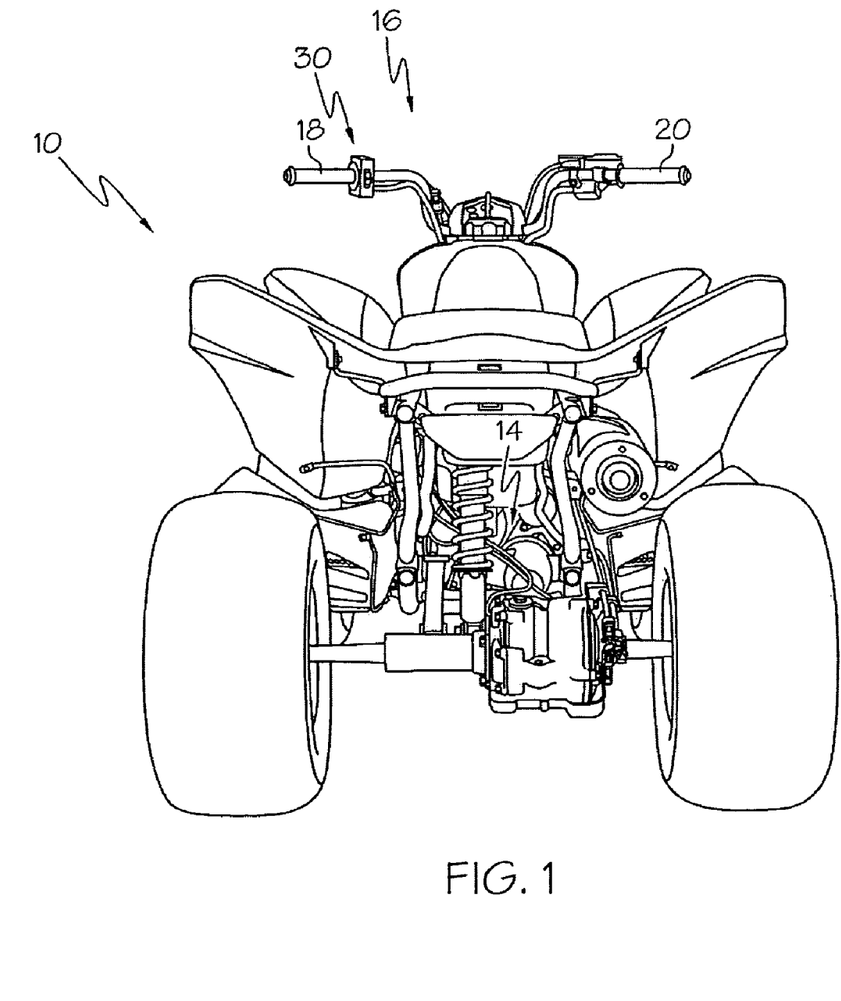
FIG. 1 is a rear perspective view of an ATV in accordance with one embodiment of the present invention.
Figure 2:
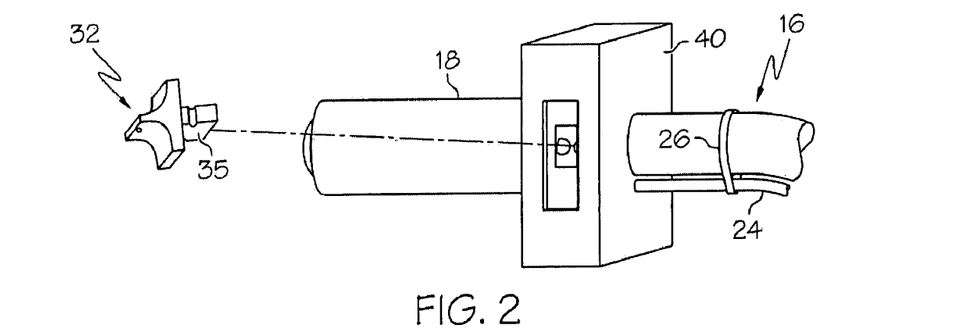
FIG. 2 is a perspective view depicting an enlargement of a portion of the ATV of FIG. 1 including a locking assembly, wherein the locking assembly is shown to have a removable portion and a receptacle, and the removable portion is not engaged in the receptacle.
Figure 3:
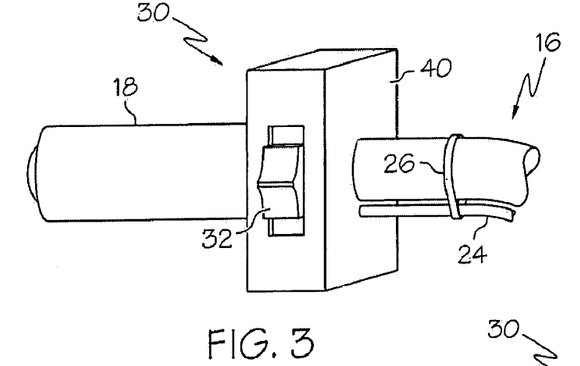
FIG. 3 is a perspective view depicting the portion of the ATV of FIG. 2 wherein the removable portion is engaged in the receptacle and the actuator is in a central position.
Figure 4:
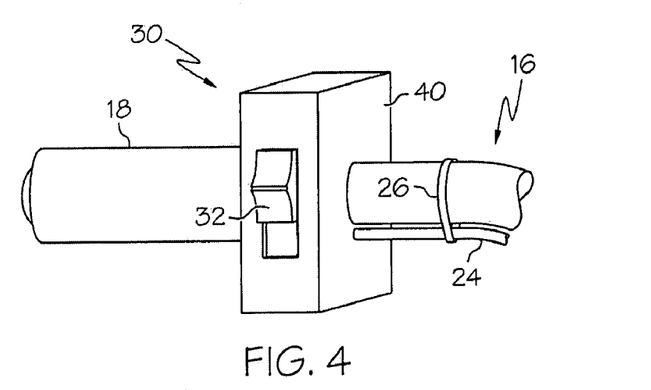
FIG. 4 is a perspective view depicting the portion of the ATV of FIG. 2 wherein the removable portion is engaged in the receptacle and the actuator is in an upper outer position.
Figure 5:
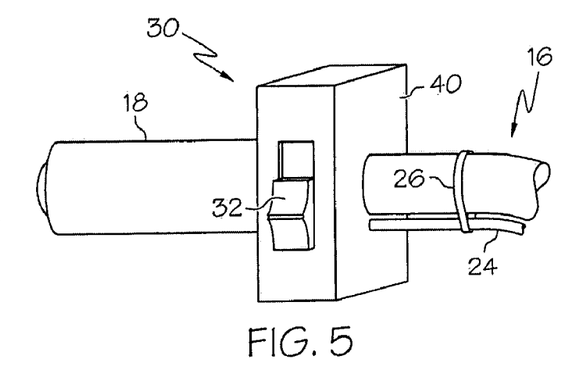
FIG. 5 is a perspective view depicting the portion of the ATV of FIG. 2 wherein the removable portion is engaged in the receptacle and the actuator is in a lower outer position.

A saddle-type vehicle in accordance with one embodiment of the present invention can include, for example, any of a variety of vehicles configured for recreational and/or utility purposes and that comprise a handlebar to facilitate steering of the vehicle by an operator. Saddle-type vehicles can include motorcycles, mopeds, scooters, ATVs, and personal watercraft, for example. For example, as shown in FIG. 1, a saddle-type vehicle is shown to comprise an ATV 10. Though the ATV 10 is shown to comprise four wheels, it will be appreciated that an ATV in accordance with an alternative embodiment of the present invention may include fewer or greater than four wheels. One or more of the ATV's wheels can be configured as drive wheels, whereby their rotation is caused by a drive system present upon the ATV, and their contact with the ground while rotating causes movement of the ATV.

The ATV 10 is shown in FIG. 1 to include a handlebar 16 to facilitate steering of the ATV 10 by an operator of the ATV 10. The handlebar 16 can be provided with a left handgrip 18 and a right handgrip 20. An operator of the ATV 10 can, during operation of the ATV 10, selectively place his or her left hand on the left handgrip 18 and/or his or her right hand on the right handgrip 20.

An ATV in accordance with one embodiment of the present invention will include an engine, as is generally depicted at location 14 in FIG. 1. Although the engine may include an internal combustion engine to facilitate rotation of the ATV's drive wheels, the engine may additionally or alternatively include an electric motor to facilitate this rotation. In such circumstances where an internal combustion engine is provided, the internal combustion engine can be configured to consume gasoline, diesel fuel, kerosene, natural gas, propane, alcohol, and/or any of a variety of other fuels.

A locking assembly can be provided upon a saddle-type vehicle in accordance with one embodiment of the present invention. For example, in one embodiment of the present invention, the locking assembly can be supported with respect to a handlebar of a saddle-type vehicle. The locking assembly may be supported with respect to the handlebar by direct or indirect attachment to the handlebar. Additionally, the locking assembly can be attached to the handlebar at a location such that the locking assembly may be operable through use of an operator's right or left hand, and without, requiring removal of the operator's right or left hand from the handlebar. For example, in one embodiment of the present invention, as shown in FIG. 1, the locking assembly 30 can be attached to the handlebar 16 at a location adjacent to the left handgrip 18. In another embodiment of the present invention, a locking assembly can be attached to a handlebar 16 at a location adjacent to a right handgrip.

The locking assembly 30 is shown in FIGS. 2-11 as including a removable portion 32 and a receptacle 40. The receptacle 40 is shown to be configured for selectively receiving the removable portion 32. In one embodiment of the present invention, the receptacle can be provided within a housing which also includes one or more control devices such as, for example, engine controls, gear shifting controls, drive wheel selection controls, horn controls, radio controls, and/or lamp controls such as for running lights, utility lights, headlights, and/or turn signals.

As will be described in further detail below, it will be appreciated that, when the removable portion 32 is removed from the receptacle 40, and is thus disengaged from the receptacle 40, operation of the ATV 10 can be prohibited. However, when the removable portion 32 is inserted into the receptacle 40, and is thus engaged with the receptacle 40, powering and operation of the ATV 10 can be enabled. In this manner, the removable portion 32 can serve the role of a conventional key to facilitate selective powering of the ATV 10. When the removable portion 32 is engaged in the receptacle 40, at least part of the removable portion 32 may be repositioned by an operator from a first position (e.g., an "on" position, shown in FIG. 3) to a second position (e.g., an "off" position, shown in both FIGS. 4 and 5) to selectively discontinue engine operation as desired. In this manner, repositioning the removable portion 32 within the receptacle 40 can provide an engine stop or kill function as desired.

Figure 8:
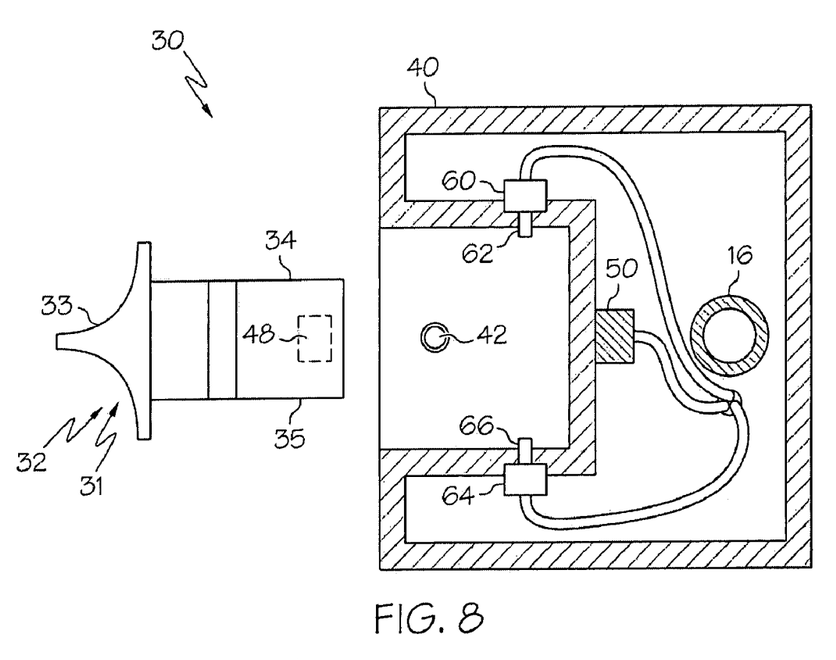
FIG. 8 is a side cross-sectional view depicting an enlargement of the locking assembly of FIG. 2, wherein the removable portion is not engaged in the receptacle.
Figure 9:
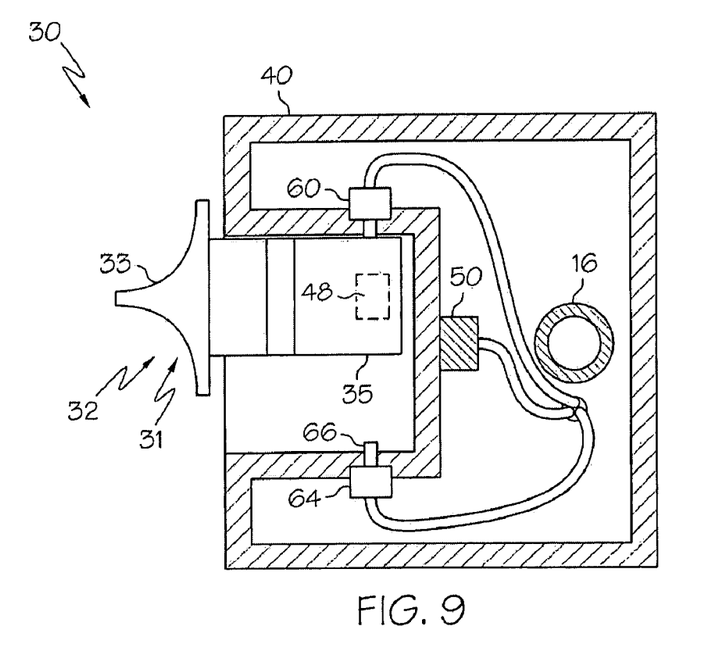
FIG. 9 is a side cross-sectional view depicting the locking assembly of FIG. 8, wherein the removable portion is engaged in the receptacle and the actuator is in an upper outer position.
Figure 10:
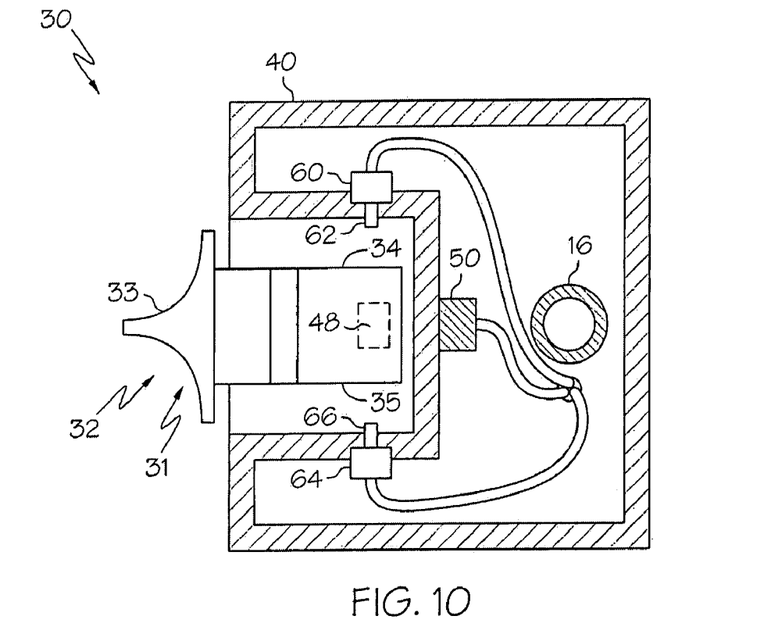
FIG. 10 is a side cross-sectional view depicting the locking assembly of FIG. 8, wherein the removable portion is engaged in the receptacle and the actuator is in a central position.
Figure 11:
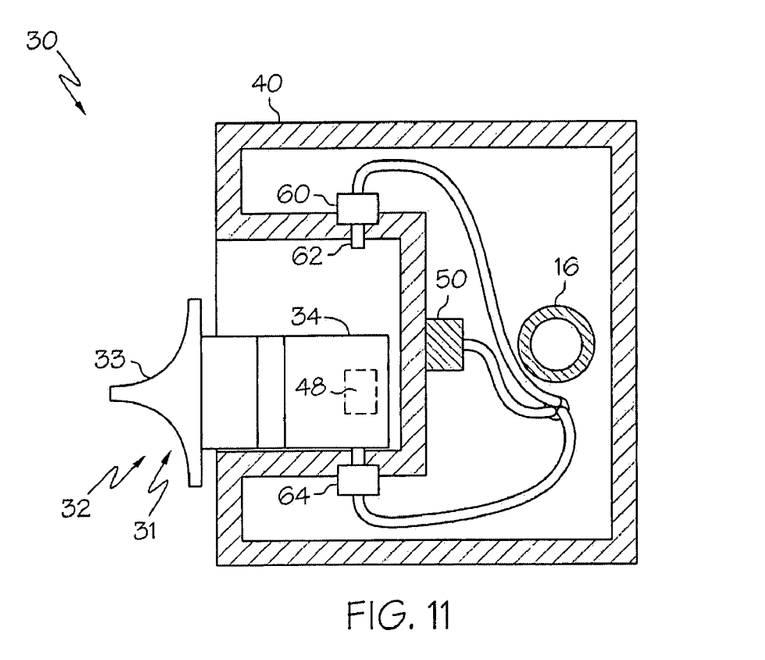
FIG. 11 is a side cross-sectional view depicting the locking assembly of FIG. 8, wherein the removable portion is engaged in the receptacle and the actuator is in a lower outer position.

As shown in FIG. 8, for example, the removable portion 32 can comprise an actuator 31 which, in this embodiment, includes a handle 33 and two surfaces 34 and 35. The receptacle 40 may comprise two pushbutton assemblies 60 and 64 which each respectively include plunger portions 62 and 66. The actuator 31 may be moved from the central position to the upper or lower positions by gripping the handle 33 and then physically moving (e.g., by sliding) the removable portion 32 so that one of the surfaces 34 and 35 pushes against one of the plunger portions 62 and 66. Depression of one of the plunger portions 62 and 66 resulting from contact by one of the surfaces 34 or 35 can facilitate discontinued or prevention of engine operation. One skilled in the art will recognize that other actuator configurations are possible, including, for example, actuators that do not involve movement of the entire removable portion with respect to the receptacle, or actuators that interact with the receptacle through use of a mechanism other than a pushbutton. Such mechanisms can involve, for example, an, inductive proximity sensor, a capacitive proximity sensor, an RF transponder, an optical sensor, or otherwise. Although FIGS. 4-5, 9 and 11 illustrate the actuator 31, once the removable portion 32 is engaged with the receptacle 40, as being slidable within the receptacle 32 (like a slide-type switch), it will be appreciated that an actuator may alternatively interact with an engaged receptacle such as in a pushbutton, rocker, rotational, toggle, or other arrangement. Also, although FIGS. 3-5 and 9-11 illustrate the actuator 31 as having three selectable positions (i.e., central, upper outer, and lower outer) once engaged with the receptacle 40, it will be appreciated that an actuator may alternatively have two positions or more than three positions as desired, wherein at least one position is configured to allow engine operation and at least one position is configured to prevent or discontinue engine operation.

Figure 6:
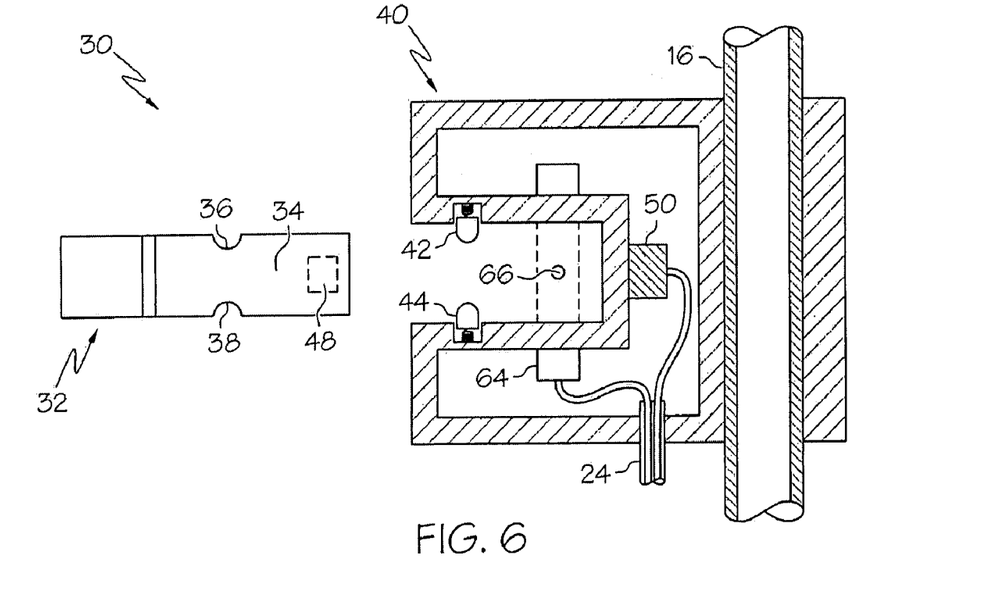
FIG. 6 is a top cross-sectional view depicting an enlargement of the locking assembly of FIG. 2, wherein the removable portion is not engaged in the receptacle.
Figure 7:
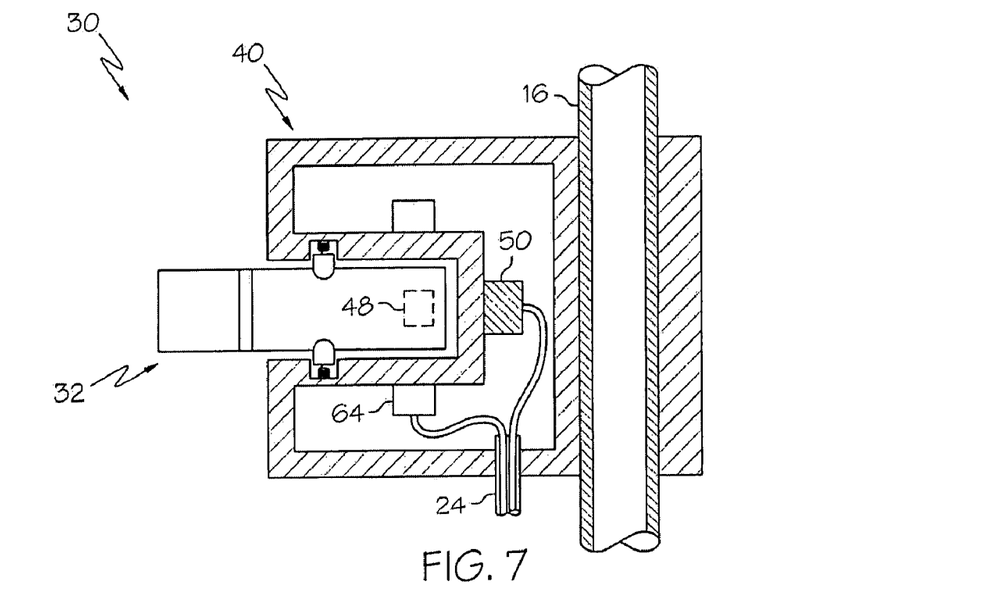
FIG. 7 is a top cross-sectional view depicting the locking assembly of FIG. 6, wherein the removable portion is engaged in the receptacle.

When engaged with the receptacle 40, the removable portion 32 can be selectively held within the receptacle 40 in any of a variety of alternative configurations. For example, as shown in FIGS. 6-7, the removable portion 32 can be removably held in an engaged position within the receptacle 40 through use of grooves 36 and 38 in the removable portion 32 receiving detents 42 and 44 of the receptacle 40. While the detents 42 and 44 can be configured to selectively interact with the removable portion 32 for holding the removable portion 32 within the receptacle 40 during normal use of the ATV 10, it will be appreciated that an operator of the ATV 10 can apply sufficient force as desired to pull or otherwise remove the removable portion 32 from the receptacle 40. In one embodiment of the present invention, as shown in FIGS. 6-7, the detents 42 and 44 can be spring-biased. One skilled in the art will recognize that there are many alternative configurations in which a removable portion may be selectively held in an engaged position with respect to a receptacle including, for example, spring-and-hook systems, push-and-rotate systems, expandable flange systems, or combinations thereof.

It will be appreciated that a locking mechanism can be operable to secure a saddle-type vehicle from unauthorized use. For example, as shown in FIGS. 6 and 8, the removable portion 32 can be disengaged from the receptacle 40, thereby locking the locking assembly 30 and preventing powering of the ATV 10. FIGS. 7 and 9-11 depict the removable portion 32 being engaged in the receptacle 40, thereby allowing powering of the ATV 10. More specifically, the removable portion 32 can be engaged with the receptacle 40 if two conditions are met: (1) the removable portion 32 is placed in the receptacle 40, and (2) a sensor (e.g., 50) identifies the removable portion 32 as having an engaging configuration. An engaging configuration allows the locking assembly 30 to be unlocked when the removable portion 32 is placed in the receptacle 40. Conversely, a non-engaging configuration does not allow the locking assembly 30 to be unlocked when the removable portion 32 is placed in the receptacle 40.

In one embodiment of the present invention, a locking assembly can be configured such that the ratio of engaging configurations to non-engaging configurations can be at least about 300. In such a configuration, a removable portion and the receptacle can have only one engaging configuration for at least about 300 non-engaging configurations. As such, a given, removable portion may only be adapted to facilitate operation of no more than about 1 of 300 vehicles, thereby making it unlikely that a removable portion can be used to start a random vehicle, and accordingly providing a security function. In another embodiment of the present invention, the ratio can be at least about 720, thereby making it even more unlikely that a removable portion can be used to start a random vehicle, and accordingly providing an even more advanced security function.

As one mechanism for identification of the removable portion 32, FIGS. 6-11 illustrate the use of an embedded identifiable component 48 provided within the removable portion 32. The sensor 50 can be provided within the receptacle 40 for sensing the embedded identifiable component 48. In one embodiment of the present invention, the embedded identifiable component 48 can comprise a passive or active radio frequency identification tag or transponder (RFID). The sensor 50 can be capable of identifying the RFID and thus detecting when the removable portion 32 is engaged with the receptacle 40.

Figure 12:
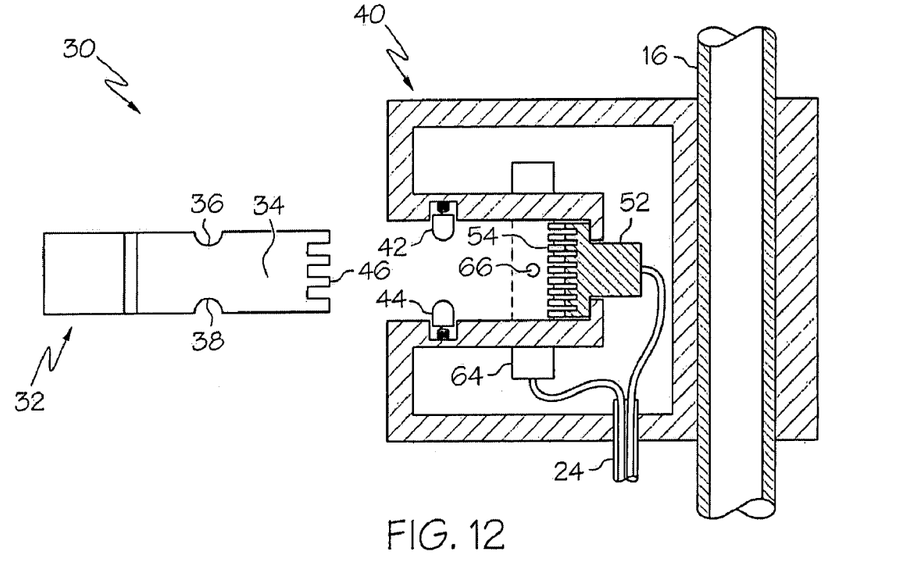
FIG. 12 is a top cross-sectional view depicting a locking assembly in accordance with another embodiment of the present invention, wherein the locking assembly is shown to have a removable portion and a receptacle, and wherein the removable portion is not engaged in the receptacle.
Figure 13:
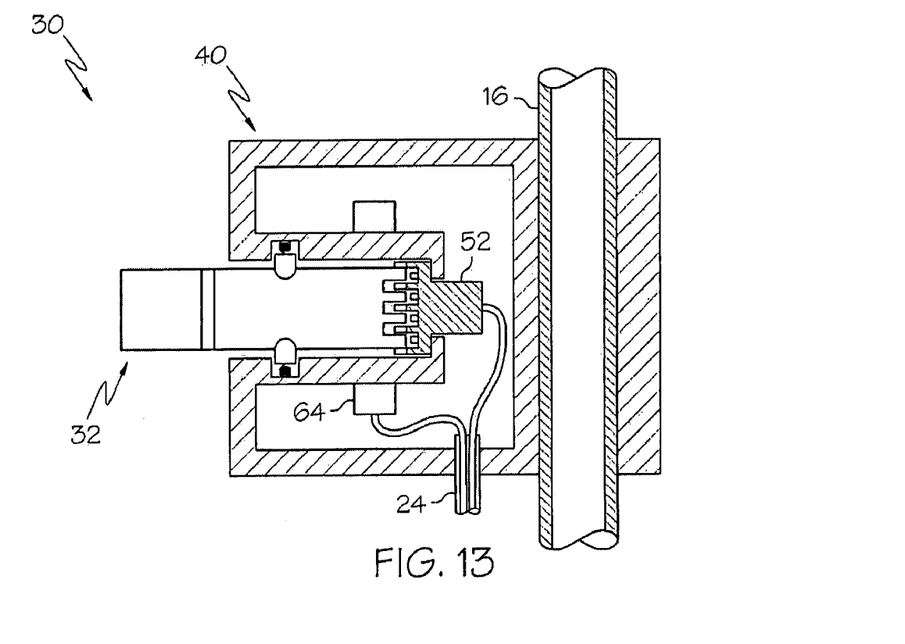
FIG. 13 is a top cross-sectional view depicting the locking assembly of FIG. 12, wherein the removable portion is engaged in the receptacle.

In an alternative embodiment of the present invention, as shown in FIGS. 12-13, the removable portion 32 can include one or more protrusions 46 which are configured to contact and selectively actuate switches (e.g., 54) provided by the sensor 52 of the receptacle 40. The pattern of actuated and unactuated switches (e.g., 54) can be used by the sensor 52 to determine if the removable portion 32 corresponds with a particular vehicle, and is thus suitable to enable operation of the vehicle. In some embodiments of the present invention, the removable portion, when engaged with a receptacle, completes an electrical circuit that is configured to unlock the locking assembly and facilitate operation of a vehicle. In this manner, by actuating switches, the removable portion can facilitate completion of an electrical circuit when the removable portion is engaged in the receptacle. In other embodiments, the removable portion participates in an optical detection arrangement when the removable portion is engaged in the receptacle in order to unlock the locking assembly. Other mechanisms may additionally or alternatively be employed to identify the removable portion including, for example, transponders, biometric readers, optical scanners, fingerprint scanners, iris scanners, magnetic strip) scanners, bar code scanners, and card scanners. It will be appreciated that the ratio of engaging configurations to non-engaging configurations can be affected by selecting a different one of the above-described mechanisms for a receptacle to identify a removable portion.

A locking assembly can be connected with an engine control unit (ECU) or other device present upon a vehicle, and can be configured to transmit electrical signals thereto. For example, such electrical signals might include information relating to whether a removable portion (e.g., 32) inserted within a receptacle (e.g., 40) corresponds with the particular vehicle, and thus whether the vehicle may be operated. Such electrical signals might also include information relating to whether the engine present on the vehicle should be allowed to operate. It will be appreciated that communication between a locking assembly and the ECU and/or other vehicle components can occur through electrical wires, fiber optics, or wirelessly, for example. For example, as shown in FIGS. 2-5, a cable 24 including at least one electrical wire can extend from the locking assembly 30, along the handlebar 16, and to other components (e.g., an ECU) of the ATV 10. One or more straps (e.g. 26) can be provided to secure the cable 24 with respect to the handlebar 16.

Significant benefits can be achieved by integrating an engine-stop actuator and a security mechanism into a single control device. For example, any cables extending from the actuator can be bundled with any cables leading from the security mechanism:, and can, for example, even be disposed within a common outer wire sheath or insulation as shown, for example, in FIGS. 2-13. Also, integrating the engine-stop actuator and the security mechanism into a single device can achieve improved appearance, conserve space and weight, reduce cost, reduce the number of components, and/or decrease the manufacturing tine of the vehicle.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended that the scope of the invention, be defined by the claims appended hereto.

What is claimed is:

1. An all terrain vehicle comprising:
   a frame;
   an engine supported with respect to the frame;
   a handlebar; and
   a locking assembly supported with respect to the handlebar and having a locked condition and an unlocked condition, wherein
   (a) the locking assembly comprises a removable portion, a receptacle configured to engage the removable portion and a sensor provided within the receptacle, the locking assembly being configured
      (i) to unlock and allow powering of the all terrain vehicle when the removable portion is engaged in the receptacle, the removable portion being engaged in the receptacle when the removable portion is inserted into the receptacle and the sensor identifies the removable portion as having an engaging configuration, and
      (ii) to lock and prevent powering of the all terrain vehicle when the removable portion is not engaged in the receptacle, and
   (b) the removable portion comprises an actuator slidable within the receptacle to select from a first operable engine condition and a second inoperable engine condition when the removable portion is engaged in the receptacle.

2. The all terrain vehicle of claim 1 wherein the actuator is positioned to be operable using an operator's left hand without removing the operator's left hand from the handlebar.

3. The all terrain vehicle of claim 2 further comprising a left handgrip attached to the handlebar, wherein the locking assembly is attached to the handlebar at a location adjacent to the left handgrip.

4. The all terrain vehicle of claim 1 wherein the removable portion and the receptacle have an engaging configuration and at least about 300 non-engaging configurations.

5. The all terrain vehicle of claim 4 wherein the removable portion and the receptacle have an engaging configuration and at least about 720 non-engaging configurations.

6. The all terrain vehicle of claim 1 wherein the receptacle comprises at least one detent configured to selectively interact with the removable portion.

7. The all terrain vehicle of claim 1 wherein the actuator has three selectable positions comprising a central position and two outer positions, wherein
the engine is operable when the actuator is positioned in the central position, and
the engine is inoperable when the actuator is positioned in either of the outer positions.

8. The all terrain vehicle of claim 7 wherein the removable portion comprises at least one protrusion that is configured to contact at least one switch when the removable portion is engaged in the receptacle.

9. The all terrain vehicle of claim 7 wherein the removable portion facilitates completion of an electrical circuit when the removable portion is engaged in the receptacle.

10. The all terrain vehicle of claim 1 wherein the removable portion comprises a plurality of protrusions and the sensor comprises a plurality of switches, at least some of the protrusions being configured to contact and actuate a respective one of the switches when the removable portion is engaged in the receptacle to facilitate the determination, by the sensor, if the removable portion corresponds with the all terrain vehicle and is suitable to enable operation of the all terrain vehicle.

11. The all terrain vehicle of claim 1 wherein the removable portion facilitates completion of an electrical circuit when the removable portion is engaged in the receptacle.

12. The all terrain vehicle of claim 1 wherein the removable portion comprises an embedded identifiable component.

13. A saddle-type vehicle comprising:
a frame;
an engine supported with respect to the frame;
a steering assembly; and
a locking assembly supported with respect to the steering assembly and having a locked condition and an unlocked condition, wherein
(a) the locking assembly comprises a removable portion, a receptacle configured to engage the removable portion and a sensor provided within the receptacle, the removable portion comprising a plurality of protrusions, the sensor comprising a plurality of switches, at least some of the protrusions being configured to contact and selectively actuate a respective one of the switches, the protrusions and the switches cooperating to provide a pattern of actuated and unactuated ones of the switches, the locking assembly being configured
(i) to unlock and allow powering of the saddle-type vehicle when the removable portion is inserted in the receptacle and the sensor determines that the pattern of actuated and unactuated switches corresponds to the saddle-type vehicle, such that the removable portion is engaged in the receptacle, and
(ii) to lock and prevent powering of the saddle-type vehicle when the removable portion is not engaged in the receptacle, and
(b) the removable portion includes an actuator configured to select from a first operable engine condition and a second inoperable engine condition when the removable portion is engaged in the receptacle.

14. The saddle-type vehicle of claim 13 wherein the actuator is slidable within the receptacle to select from the first operable engine condition and the second inoperable engine condition.

15. The saddle-type vehicle of claim 13 wherein the actuator has three selectable positions comprising a central position and two outer positions, wherein
the engine is operable when the actuator is positioned in the central position, and
the engine is inoperable when the actuator is positioned in either of the outer positions.

16. The saddle-type vehicle of claim 15 wherein:
the removable portion comprises a plurality of grooves;
the receptacle comprises a plurality of detents; and
each of the grooves receives a respective one of the detents when the removable portion is in an engaged position within the receptacle.

17. The saddle-type vehicle of claim 15 wherein the removable portion completes an electrical circuit when the removable portion is engaged in the receptacle.

18. A locking assembly for an engine-powered vehicle, the locking assembly having:
a locked configuration and an unlocked configuration and comprising a removable portion and a receptacle configured to engage the removable portion, wherein the locking assembly is configured
(i) to unlock and allow powering of a vehicle when the removable portion is engaged in the receptacle and
(ii) to lock and prevent powering of a vehicle when the removable portion is not engaged in the receptacle, and
wherein the removable portion comprises an actuator and a plurality of grooves, the actuator being slidable within the receptacle to select from a first operable engine condition and a second inoperable engine condition, the receptacle comprising a plurality of detents, each of the grooves receiving a respective one of the detents when the removable portion is in an engaged position within the receptacle.

19. The locking assembly of claim 18 wherein the removable portion comprises an embedded identifiable component.

20. The locking assembly of claim 18 wherein the actuator has three selectable positions comprising a central position and two outer positions, wherein
the actuator is configured to facilitate operation of an engine when the actuator is positioned in the central position, and
the actuator is configured to disable operation of an engine when the actuator is positioned in either of the outer positions.

21. The locking assembly of claim 20 wherein the removable portion comprises at least one protrusion that is configured to contact at least one switch when the removable portion is engaged in the receptacle.

22. The locking assembly of claim 20 wherein the removable portion completes an electrical circuit when the removable portion is engaged in the receptacle.

* * * * *